United States Patent
Zuleta et al.

(10) Patent No.: US 12,436,007 B2
(45) Date of Patent: Oct. 7, 2025

(54) REMOVABLE COUPLING SYSTEMS FOR ROTATING SENSORS

(71) Applicant: Ontic Engineering & Manufacturing Inc., Chatsworth, CA (US)

(72) Inventors: Alexander Zuleta, Creedmoor, NC (US); Pete Tola, Jr., Creedmoor, NC (US)

(73) Assignee: Ontic Engineering & Manufacturing Inc., Chatsworth, CA (US)

( * ) Notice: Subject to any disclaimer, the term of this patent is extended or adjusted under 35 U.S.C. 154(b) by 358 days.

(21) Appl. No.: 18/329,498

(22) Filed: Jun. 5, 2023

(65) Prior Publication Data

US 2024/0027239 A1    Jan. 25, 2024

Related U.S. Application Data

(60) Provisional application No. 63/369,302, filed on Jul. 25, 2022.

(51) Int. Cl.
  *G01D 5/00* (2006.01)
  *G01D 11/30* (2006.01)
  *B65H 75/48* (2006.01)

(52) U.S. Cl.
  CPC .............. *G01D 11/30* (2013.01); *G01D 5/00* (2013.01); *B65H 75/48* (2013.01); *B65H 2402/60* (2013.01); *B65H 2553/51* (2013.01); *B65H 2701/35* (2013.01)

(58) Field of Classification Search
  CPC ....................................................... G01D 5/00
  USPC ........ 33/1 PT, 1 N, 706, 707, 708, 733, 762, 33/763
  See application file for complete search history.

(56) References Cited

U.S. PATENT DOCUMENTS

| | | | | |
|---|---|---|---|---|
| 6,347,462 B1* | 2/2002 | Steinich | ................... | G01B 3/11 33/756 |
| 6,412,182 B1* | 7/2002 | Reichl | ................... | G01D 5/145 33/708 |
| 6,609,309 B2* | 8/2003 | Shibuya | ................. | G01D 5/165 33/759 |
| 7,257,926 B1* | 8/2007 | Kirby | ..................... | E04F 21/22 52/749.11 |
| 7,392,597 B2* | 7/2008 | Steinich | ................. | H02G 11/02 33/1 PT |
| 7,533,472 B2* | 5/2009 | Birchinger | ............... | G01B 3/11 242/379 |

(Continued)

*Primary Examiner* — George B Bennett
(74) *Attorney, Agent, or Firm* — Eversheds Sutherland (US) LLP

(57) ABSTRACT

Removable sensor coupling systems and methods are provided. The system may include a spring-loaded reel having a reel shaft that may be removably coupled to the sensor shaft of a rotating sensor. The sensor may be configured to measure an amount of rotation of the sensor shaft responsive to rotation of the spring-loaded reel via the reel shaft. The reel shaft may have a lumen comprising a predefined geometry, and the sensor shaft may have a geometry corresponding to the predefined geometry of the lumen of the reel shaft such that, when disposed within the lumen of the reel shaft, the sensor shaft cannot rotate relative to the reel shaft. Accordingly, the sensor may be removed from the spring-loaded reel for inspection and or repair without having to disassemble the entire sensor coupling system.

21 Claims, 7 Drawing Sheets

(56) References Cited

U.S. PATENT DOCUMENTS

| | | | | |
|---|---|---|---|---|
| 8,499,464 | B2* | 8/2013 | Goll | B62D 15/022 |
| | | | | 361/292 |
| 8,726,530 | B2* | 5/2014 | Hama | B62D 6/10 |
| | | | | 33/534 |
| 9,134,123 | B2* | 9/2015 | Steinich | B60R 16/02 |
| 11,034,537 | B2* | 6/2021 | Yoon | G01B 5/02 |
| 11,150,111 | B2* | 10/2021 | Utermoehlen | G01D 5/00 |
| 11,847,270 | B2* | 12/2023 | Hartman | G01P 3/487 |
| 11,906,331 | B2* | 2/2024 | Darby | G01D 5/00 |
| 2007/0033823 | A1* | 2/2007 | Steinich | G01B 3/11 |
| | | | | 439/271 |

* cited by examiner

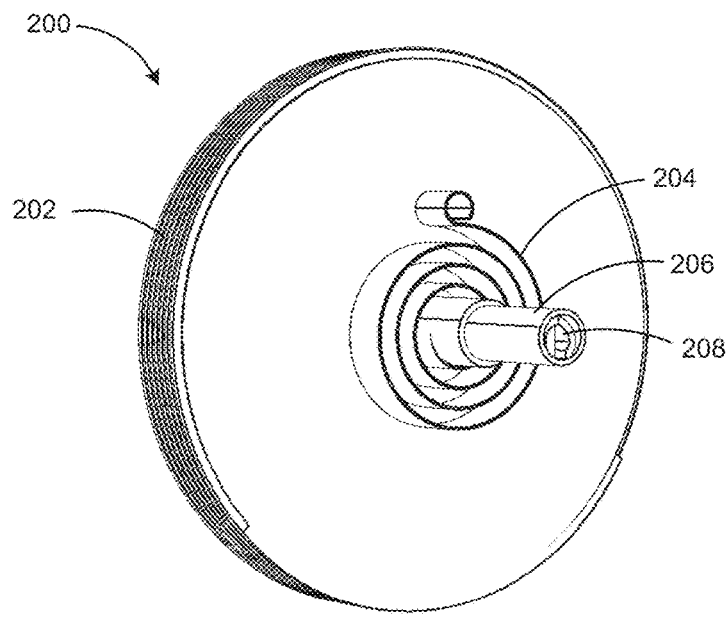
FIG. 2A
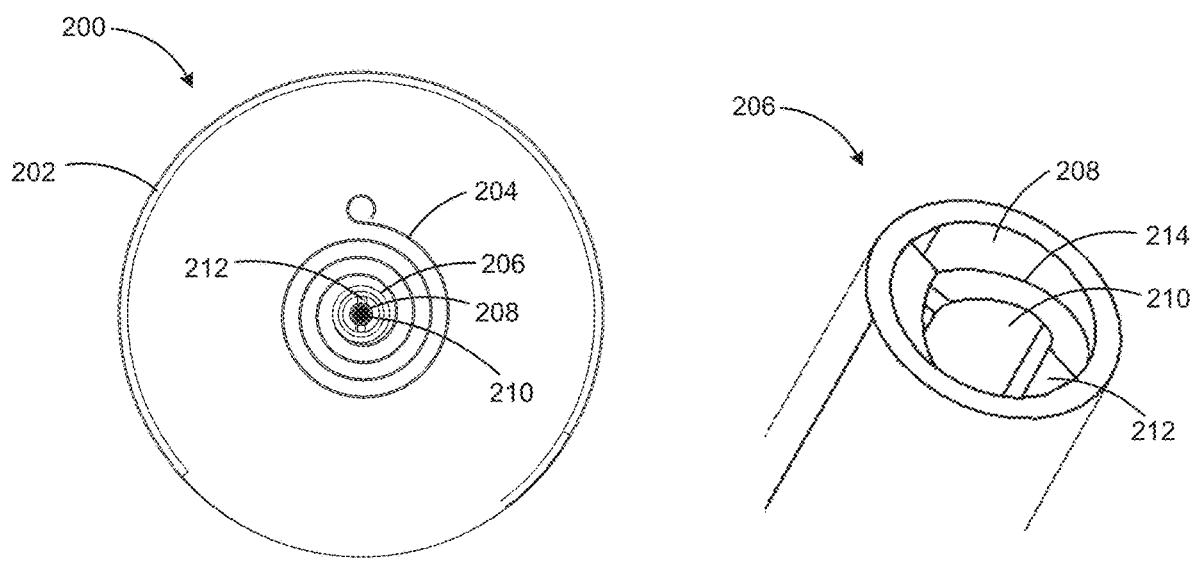
FIG. 2B
FIG. 2C

REMOVABLE COUPLING SYSTEMS FOR ROTATING SENSORS

CROSS-REFERENCE TO RELATED APPLICATION

This application claims the benefit of priority of U.S. Provisional Patent Appl. No. 63/369,302, filed Jul. 25, 2022, the entire contents of which are incorporated herein by reference.

FIELD OF USE

The present disclosure is directed to systems and methods for removably coupling a rotation sensor with a reel driven apparatus.

BACKGROUND

Rotating sensors may be used with cable driven spring-loaded rotating reels to measure displacement of an object by measuring angular rotation of the reel caused by the displacement of the object. For example, the sensor may measure rotation of a sensor shaft caused by rotation of a reel shaft of the spring-loaded reel coupled to the sensor shaft, responsive to movement of the object coupled to the cable.

Typically, the sensor shaft is fixedly coupled to the reel shaft in a single piece design, e.g., within a system housing via a plurality of internal pins configured to engage the sensor shaft with the reel shaft, such that the rotation of the reel shaft causes rotation of the sensor shaft. During use, components of the system such as the sensor, may be damaged, requiring inspection and/or repair or replacement. With current systems, the housing of the sensor system must be disassembled in order to access and disengage the internal pins to remove and repair the sensor.

In view of the foregoing drawbacks of previously known systems and methods, there exists a need for a sensor system that does not require disassembly of the entire system in order to remove the sensor.

SUMMARY

The present disclosure overcomes the drawbacks of previously-known systems and methods by providing a sensor coupling system. The system may include a spring-loaded reel having a reel shaft. The reel shaft may have a lumen having a predefined geometry. In addition, the system may include a sensor including a sensor body that may be removably coupled to a fixed surface, and a sensor shaft rotatably coupled to the sensor body. The sensor shaft may be sized and shaped to be slidably received by the lumen of the reel shaft. The sensor shaft may have a geometry corresponding to the predefined geometry of the lumen of the reel shaft such that, when disposed within the lumen of the reel shaft, the sensor shaft cannot rotate relative to the reel shaft. Moreover, the sensor may measure an amount of rotation of the sensor shaft relative to the sensor body responsive to rotation of the spring-loaded reel via the reel shaft.

The spring-loaded reel may have a circular profile. The system further may include a cable having a first end coupled to a point along the circular profile of the spring-loaded reel, and an opposite end coupled to an external component, such that the cable at least partially wraps around the spring-loaded reel along the circular profile. Movement of the external component may cause movement of the cable, thereby causing rotation of the spring-loaded reel. In addition, an inlet of the reel shaft may have one or more tapered geometries sized and shaped to facilitate alignment of the geometry of the sensor shaft within the predefined geometry of the lumen of the reel shaft. For example, the one or more tapered geometries may have one or more ramp portions extending along an inner surface of the lumen of the reel shaft.

The sensor shaft may have one or more radially extending protrusions. Accordingly, the predefined geometry of the lumen of the reel shaft may be sized and shaped to receive the sensor shaft and the one or more radially extending protrusions such that, when disposed within the lumen of the reel shaft, the sensor shaft and the one or more radially extending protrusions cannot rotate relative to the reel shaft. For example, the one or more radially extending protrusions may be evenly distributed along a circumference of the sensor shaft. The one or more radially extending protrusions may include a pair of radially extending protrusions disposed on opposite sides of the sensor shaft. The sensor shaft may have a circular profile, such that the one or more radially extending protrusions are disposed along an outer surface of the sensor shaft.

In some embodiments, the sensor shaft may have an oblong shape. Accordingly, the predefined geometry of the lumen of the reel shaft may have a corresponding oblong shape such that, when disposed within the lumen of the reel shaft, the sensor shaft cannot rotate relative to the reel shaft. For example, the oblong shape may be an oval, triangle, square, rectangle, diamond, star, or other polygon shape. The sensor may include at least one of a potentiometer, an encoder, or a rotating transducer. In addition, the sensor may generate one or more signals indicative of the measured amount of rotation of the sensor shaft relative to the sensor body. Thus, the sensor body may include one or more terminals configured to transmit the one or more signals.

The system further may include a housing that may be a coupled to a second fixed surface. The spring-loaded reel may be rotatably disposed within the housing. In some embodiments, the housing may have the fixed surface removably coupled to the sensor body. The housing further may include an inlet sized and shaped to receive at least a portion of the sensor body therein, and an expandable lip adjacent to the inlet. The expandable lip may be actuated to transition between a collapsed state and an expanded state, such that the expandable lip may fix the sensor body relative to the housing in the expanded state. In addition, the housing may include one or more screws operatively coupled to the expandable lip, such that the screws may be actuated to transition the expandable lip from the collapsed state to the expanded state.

In accordance with another aspect of the present disclosure, another sensor coupling system is provided. The system may include a housing that may be mounted to a fixed surface, a spring-loaded reel rotatably disposed within the housing, and a sensor. The spring-loaded reel may include a reel shaft having a lumen having a predefined geometry. The sensor may include a sensor body that may be removably coupled to the housing, and a sensor shaft rotatably coupled to the sensor body. The sensor shaft may be slidably received by the lumen of the reel shaft, and may have a geometry corresponding to the predefined geometry of the lumen of the reel shaft such that, when disposed within the lumen of the reel shaft, the sensor shaft cannot rotate relative to the reel shaft. The sensor may measure an amount of rotation of the sensor shaft relative to the sensor body responsive to rotation of the spring-loaded reel via the reel shaft.

The housing may include an inlet sized and shaped to receive at least a portion of the sensor body therein, and an expandable lip adjacent to the inlet. The expandable lip may be actuated to transition between a collapsed state and an expanded state, such that the expandable lip may fix the sensor body relative to the housing in the expanded state. Moreover, the housing may include one or more screws operatively coupled to the expandable lip, such that the one or more screws may be actuated to transition the expandable lip from the collapsed state to the expanded state. The sensor shaft may include one or more radially extending protrusions. Accordingly, the predefined geometry of the lumen of the reel shaft may be sized and shaped to receive the sensor shaft and the one or more radially extending protrusions such that, when disposed within the lumen of the reel shaft, the sensor shaft and the one or more radially extending protrusions cannot rotate relative to the reel shaft. In addition, the system may include a cable having a first end coupled to a point along the circular profile of the spring-loaded reel, and an opposite end coupled to an external component outside of the housing, such that the cable at least partially wraps around the spring-loaded reel along the circular profile. Movement of the external component may cause movement of the cable, thereby causing rotation of the spring-loaded reel.

BRIEF DESCRIPTION OF THE DRAWINGS

FIGS. 2A and 2B illustrate an exemplary spring-loaded reel constructed in accordance with the principles of the present disclosure.

FIG. 2C illustrates an exemplary inlet of the reel shaft of the spring-loaded reel of FIGS. 2A and 2B, constructed in accordance with the principles of the present disclosure.

DETAILED DESCRIPTION

The removable coupling systems described herein allow for ease of manufacturing as the sensor may be manufactured independently from the cable driven reel assembly, and then subsequently integrated into a final assembly via the removable coupling features described below. For example, the sensor shaft of the sensor may have a predefined geometry, and the lumen of the reel shaft may have a corresponding geometry sized and shaped to receive at least a portion of the sensor shaft therein, such that, when disposed within the lumen of the reel shaft, axial movement of the sensor shaft within the lumen of the reel shaft is permitted while rotation of the sensor shaft relative to the reel shaft is prevented. When the sensor shaft is coupled to the reel shaft, rotation of the sensor shaft relative to the sensor body of the sensor due to rotation of the reel shaft of the cable driven reel assembly may be measured by the sensor assembly. Moreover, if the sensor needs to be removed from the reel assembly, e.g., for inspection and/or repair or replacement, the sensor shaft may easily be axially removed from the reel shaft without having to disassemble the coupling system.

In some embodiments, the length of the reel shaft may be selected to provide a variety of applications that would not be feasible with a single piece design. For example, the reel assembly may be coupled to a first fixed surface within a first compartment of a structure, and the reel shaft may have a length such that the inlet of the reel shaft is disposed within or adjacent to a second compartment of the structure different from the first compartment. Accordingly, the sensor shaft of the sensor may be removably coupled to the inlet of the reel shaft within the second compartment spaced a predefined distance from the first compartment. Thus, further damage to the sensor during use may be reduced or prevented by sealing off the second compartment from the first compartment, e.g., via a sealing ring disposed over the reel shaft where the reel shaft enters the first and/or second compartment.

Figure 1A:
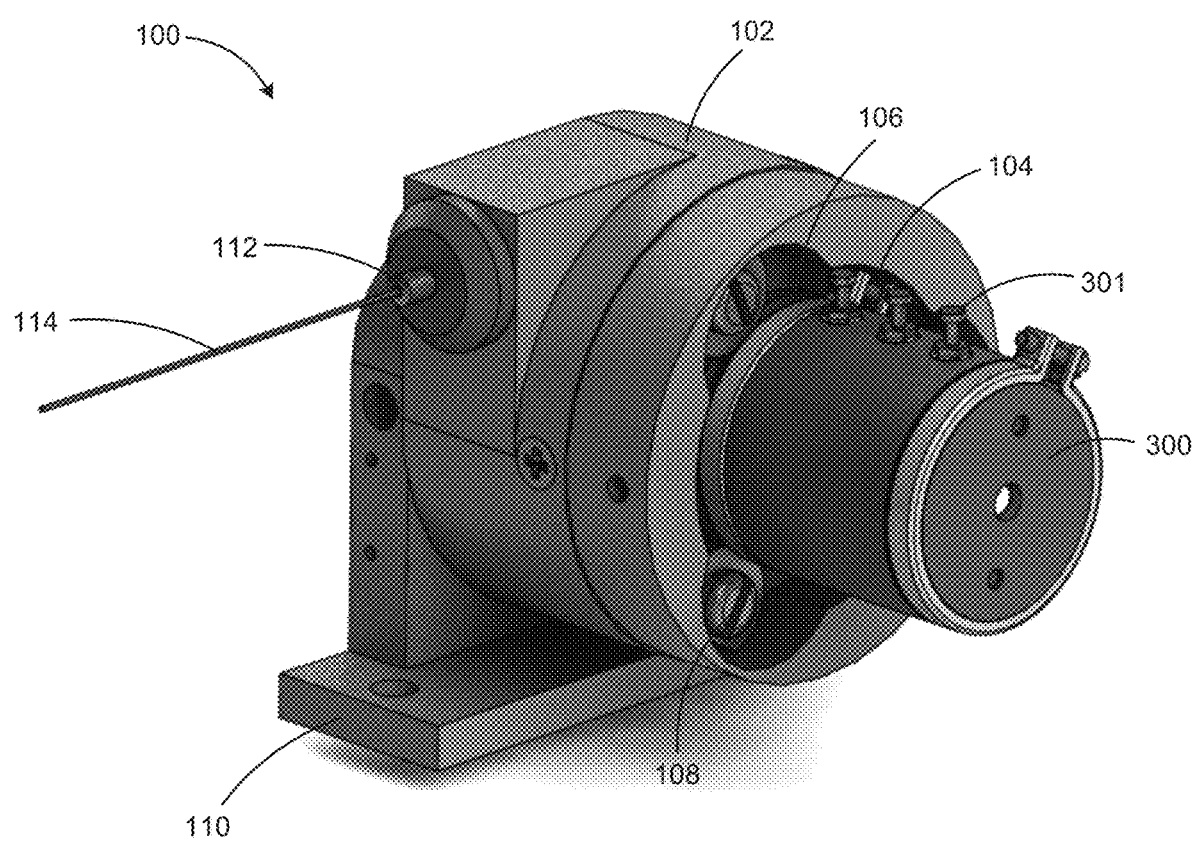
FIG. 1A illustrates an exemplary sensor coupling system constructed in accordance with the principles of the present disclosure.
Figure 1B:
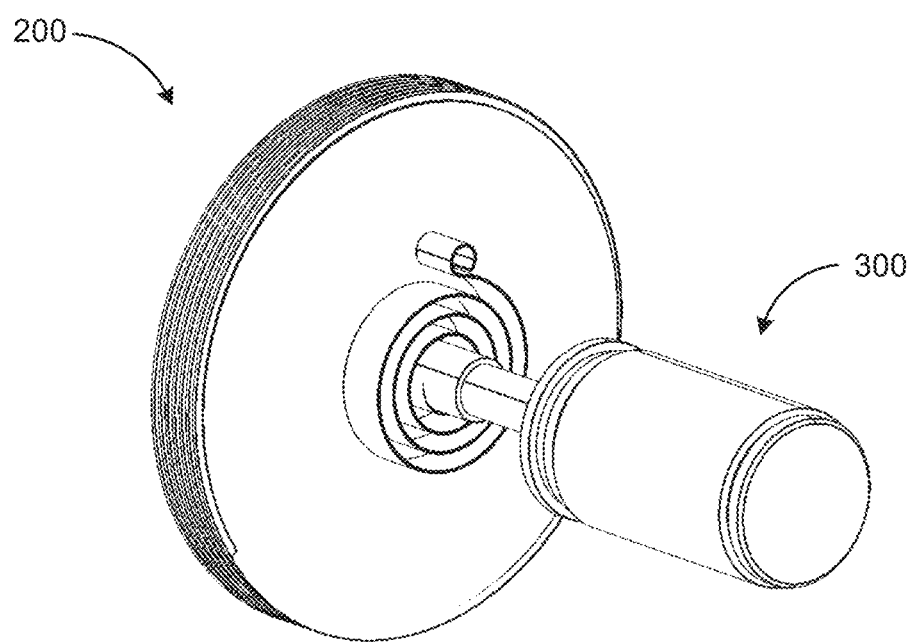
FIGS. 1B and 1C illustrate internal components of the sensor coupling system of FIG. 1A constructed in accordance with the principles of the present disclosure.
Figure 1C:
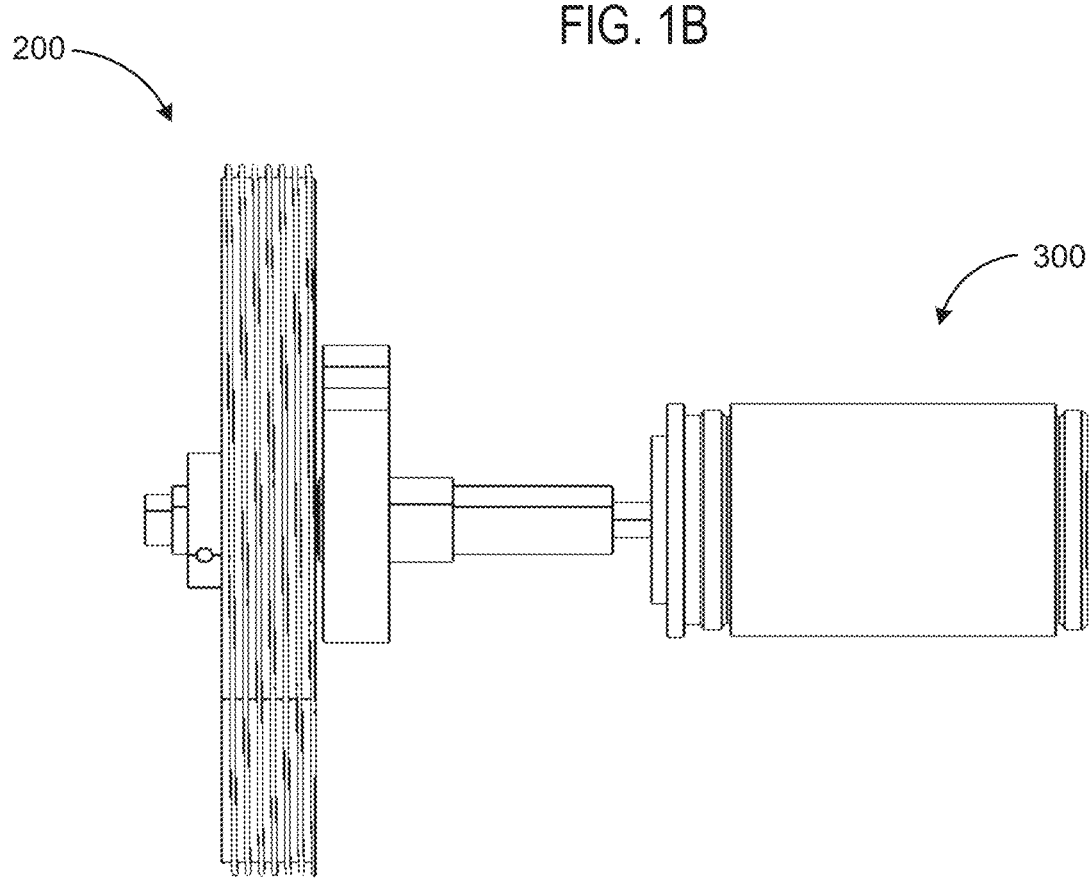

Referring now to FIGS. 1A to 1C, an exemplary sensor coupling system is provided. As shown in FIG. 1A, sensor coupling system 100 may include housing 102. Housing 102 may be sized and shaped to house reel assembly 200 and at least a portion of sensor assembly 300, which are shown in FIGS. 1B and 1C. Reel assembly 200 may be rotatably disposed within housing 102. For example, as shown in FIG. 1A, system 100 may include cable 114, which may have a first end coupled to a point along reel assembly 200 within housing 102, and a second end coupled to an external component/object outside of housing 102. Housing 102 may include cable outlet 112 sized and shaped to permit cable 114 to move therethrough. Accordingly, movement of the external component coupled to the second end of cable 114 will cause translational movement of cable 114, e.g., through cable outlet 112, thereby causing rotation of reel assembly 200 within housing 102. As described in further detail below, the amount of rotation of reel assembly 200 may be measured by sensor assembly 300 when sensor assembly 300 is coupled to reel assembly 200.

As shown in FIG. 1A, housing 102 may include sensor inlet 104 sized and shaped to receive at least a portion of sensor assembly 300 therein, e.g., when sensor assembly 300 is coupled to reel assembly 200. Housing 102 may include expandable lip 106 adjacent to sensor inlet 104, which may be configured to be actuated to expand to fix the sensor body of sensor assembly 300 relative to housing 102, while the sensor shaft of sensor assembly 300 is permitted to rotate relative to the sensor body and housing 102. For example, expandable lip 106 may fix the sensor body relative to housing 102 via friction fit. As shown in FIG. 1A, housing 102 may include actuators 108, e.g., a plurality of screws, operatively coupled to expandable lip 106. For example, the plurality of screws may be tightened relative to housing 102 to cause expandable lip 106 to expand to thereby fix the sensor body relative to housing 102, and/or may be loosened relative to housing 102 to cause expandable lip 106 to collapse to disengage with the sensor body of sensor assembly 300. Accordingly, as described in further detail below, upon insertion of the sensor shaft of sensor assembly 300 within the reel shaft of reel assembly 200, such that at least a portion of the sensor body of sensor assembly 300 is disposed within sensor inlet 104 and expandable lip 106 of housing 102, actuators 108 may be actuated to cause expandable lip 106 to expand and fix the sensor body relative to housing 102. When sensor assembly 300 needs to be removed from reel assembly 200 and housing 102, actuators 108 may be actuated to cause expandable lip 106 to collapse and disengage the sensor body from housing 102.

As shown in FIG. 1A, housing 102 further may include mounting portion 110 configured to couple housing 102 relative to a fixed surface, e.g., within the interior of a fuel tank. Accordingly, when coupled to housing 102 while housing 102 is coupled to a fixed surface via mounting portion 110, the sensor body of sensor assembly 300 also may be fixed relative to the fixed surface, such that rotation of the reel shaft and sensor shaft relative to stationary housing 102 may be measured via sensor assembly 300. For example, sensor assembly 300 may generate one or more signals indicative of the measured amount of rotation of the sensor shaft relative to the sensor body, and may include one or more terminals 301 for transmitting the one or more signals to an external computing device.

Referring now to FIGS. 2A to 2C, an exemplary reel assembly is provided. Reel assembly 200 may include spring-loaded reel 202 operatively coupled to spring 204, and reel shaft 206 extending from reel 202. For example, reel shaft 206 may extend away from reel 202 in a direction perpendicular to the plane of reel 202. As shown in FIGS. 2A and 2B, spring 204 may be coupled to reel 202 and extend circumferentially around reel shaft 208, e.g., in a spiral configuration. In addition, reel 202 may have a circular profile, as shown in FIGS. 2A and 2B. The outer edge of reel 202 may include a width extending circumferentially along the circumference of reel 202, wherein the width is sized to accommodate cable 114 thereon. As described above, a first end of cable 114 may be coupled to a point along reel assembly 200, e.g., a point along the outer edge of reel 202, such that the cable extends from the point and wraps around the outer edge of reel 202 toward cable outlet 112 of housing 102. Thus, a pulling force applied to the second end of cable 114 via the external component coupled to the second end of cable 114 causes reel 202, and accordingly reel shaft 206, to rotate. The spring force of spring 204 may bias reel 202 toward a neutral position, such that upon release of the pulling force on cable 114, spring 204 causes reel 202 to rotate in an opposite direction towards the neutral position. Accordingly, the pulling force of the cable must exceed the spring force of spring 204 to cause rotation of reel 202.

As shown in FIGS. 2A to 2C, a proximal end of reel shaft 206 may be coupled to reel 202, and a distal end of reel shaft 206 may include inlet 208. Reel shaft 206 further may include a lumen extending from inlet 208 towards the proximal end of reel shaft. For example, the lumen of reel shaft 206 may extend at least partially along the length of reel shaft 206 from inlet 208. The lumen of reel shaft 206 may have a predefined geometry sized and shaped to receive a corresponding geometry of the sensor shaft of sensor assembly 300, such that, when disposed within the lumen of reel shaft 206, the sensor shaft cannot rotate relative to reel shaft 206. Accordingly, rotation of reel shaft 206 will cause rotation of the sensor shaft when the sensor shaft is disposed within the lumen of reel shaft 206.

Figure 3:
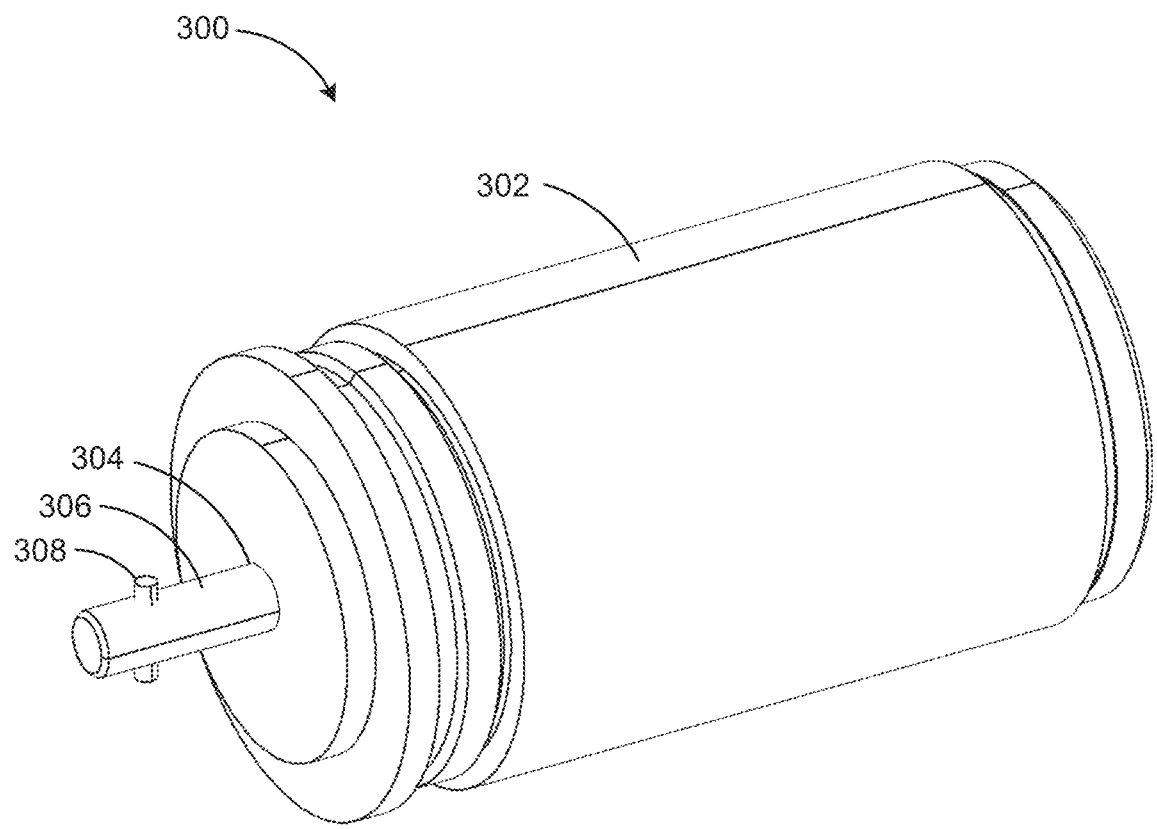
FIG. 3 illustrates an exemplary sensor constructed in accordance with the principles of the present disclosure.

For example, as shown in FIG. 2B, when the sensor shaft of sensor assembly 300 includes a tubular portion having a circular cross-sectional area and a pair of protrusions extending radially from the outer surface of the tubular portion as described in further detail with regard to FIG. 3, the lumen of reel shaft 206 may include first portion 210 having a circular cross-sectional area corresponding to the circular cross-sectional area of the tubular portion of the sensor shaft, and additional portion 212 extending radially away from first portion 210 and having a geometry sized and shaped to receive the pair of protrusions of the sensor shaft as the tubular portion of the sensor shaft is received within first portion 210. Accordingly, the sensor shaft may be received within the lumen of reel shaft 206 when the protrusions of the sensor shaft are aligned with additional portion 212 of the lumen of reel shaft 206. Thus, when the sensor shaft is disposed within the lumen of reel shaft 202, the geometry of additional portion 212 prevents rotation of the sensor shaft relative to reel shaft 206. Moreover, when reel shaft 206 is rotated, the geometry of additional portion 212 causes rotation of the sensor shaft via the pair of protrusions of the sensor shaft.

As shown in FIG. 2C, inlet 208 of reel shaft 206 may have one or more tapered portions 214 configured to facilitate alignment of the pair of protrusions of the sensor shaft with additional portion 212 of the lumen of reel shaft 206 as the sensor shaft is inserted into the lumen of reel shaft 206. For example, tapered portions 214 may include one or more ramps extending circumferentially along an inner surface of the lumen of reel shaft 206, e.g., in a spiral configuration, to thereby guide (e.g., self-locate) the pair of protrusions of the sensor shaft from inlet 208, along tapered portions 214, and toward additional portion 212 of the lumen of reel shaft 206 as the sensor shaft is moved axially into the lumen of reel shaft 206. As will be understood by a person having ordinary skill in the art, tapered portion 214 may have a geometry configured to facilitate alignment and insertion of the sensor shaft within the lumen of reel shaft 206 based on the corresponding geometry of the sensor shaft.

Referring now to FIG. 3, an exemplary sensor assembly is provided. As shown in FIG. 3, sensor assembly 300 may include sensor body 302 and sensor shaft 306 rotatably coupled to sensor body 302. For example, sensor shaft 306 may extend through inlet 304 of sensor body 302, and may be configured to rotate relative to sensor body 302, e.g., responsive to rotation of reel shaft 206. Sensor assembly 300 may include electronics within sensor body 302 configured to measure an amount of rotation of sensor shaft 306 relative to sensor body 302, e.g., the magnitude of rotation, the velocity of rotation, the acceleration of rotation, etc. For example, sensor assembly 300 may include at least one of a potentiometer, an encoder, or a rotating transducer. Sensor shaft 306 is sized and shaped to be inserted within the lumen of reel shaft 206. Accordingly, sensor shaft 306 may have a geometry corresponding to the predefined geometry of the lumen of reel shaft 206.

As described above, sensor shaft 306 may include a pair of protrusions 308 extending from the outer surface of a tubular portion of sensor shaft 306, as shown in FIG. 3. For example, protrusions 308 may be disposed adjacent to the distal end of sensor shaft 306, and may include a pair of tubular shaped pins extending from opposite sides of sensor shaft 306. Alternatively, instead of tubular shaped pins, protrusions 308 may be flat ridges extending along at least a portion of the length of sensor shaft 306, such that the flat ridges are sized and shaped to be received by additional portion 212 of the lumen of reel shaft 206. As will be understood by a person having ordinary skill in the art, sensor shaft 306 may include any combination of tubular shaped pins and/or flat ridges having a geometry that permits sensor shaft 306 to be inserted within the lumen of reel shaft 206, such that relative rotation between sensor shaft 306 and reel shaft 206 is prevented. Additionally, instead of a pair of oppositely spaced protrusions, sensor shaft 306 may include less or more than two protrusions, for example, one, three, or four or more protrusions extending radially outward from the outer surface of sensor shaft 306. Preferably, the protrusions are evenly spaced apart along the outer surface of sensor shaft 306.

As shown in FIG. 3, the distal region of sensor body 302 may include one or more grooves extending circumferentially along the outer surface of sensor body 302, sized and shaped to facilitate engagement between expandable lip 106 and sensor body 302. For example, sensor shaft 306 may be inserted within the lumen of reel shaft 306, such that at least a portion of the distal region of sensor body 302 is positioned through sensor inlet 104 of housing 102 and expandable lip 106 is aligned with the one or more grooves of sensor body 302. Accordingly, upon actuation of expandable lip 106, e.g., via actuators 108, expandable lip 106 may be expanded to engage with the one or more grooves of sensor body 302, thereby fixing sensor body 302 relative to housing 102.

Figure 4A:
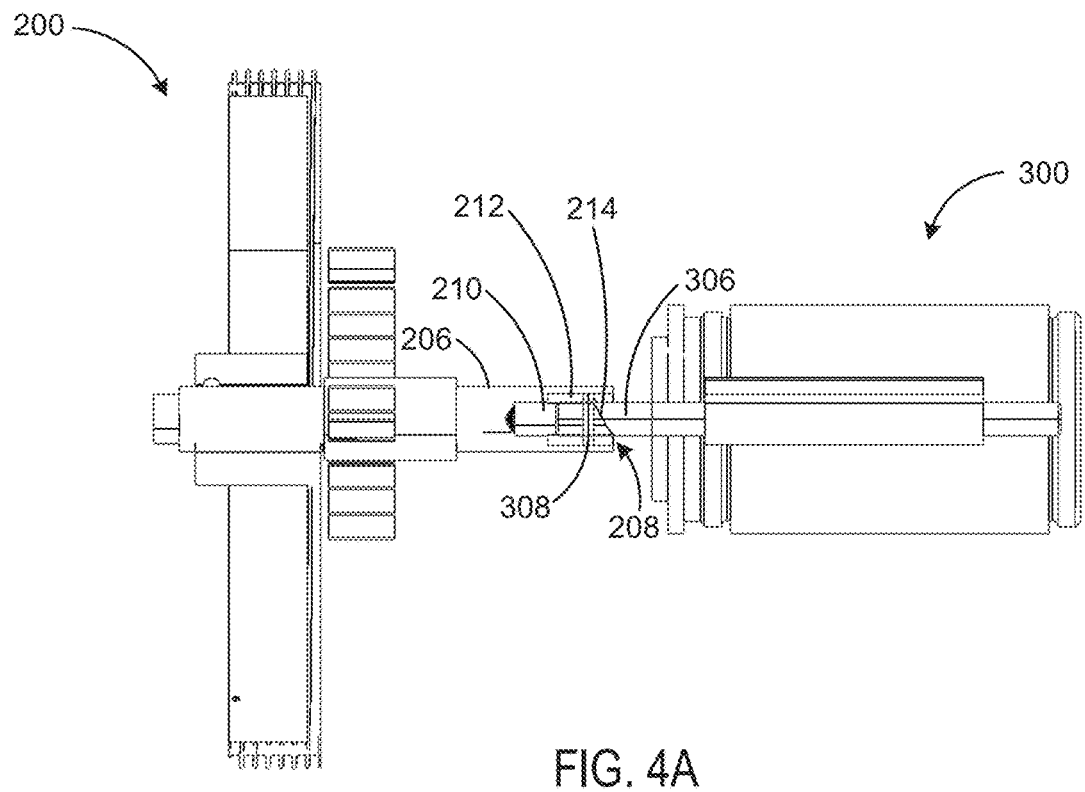
FIGS. 4A and 4B illustrate removable coupling of the sensor and the spring-loaded reel in accordance with the principles of the present disclosure.
Figure 4B:
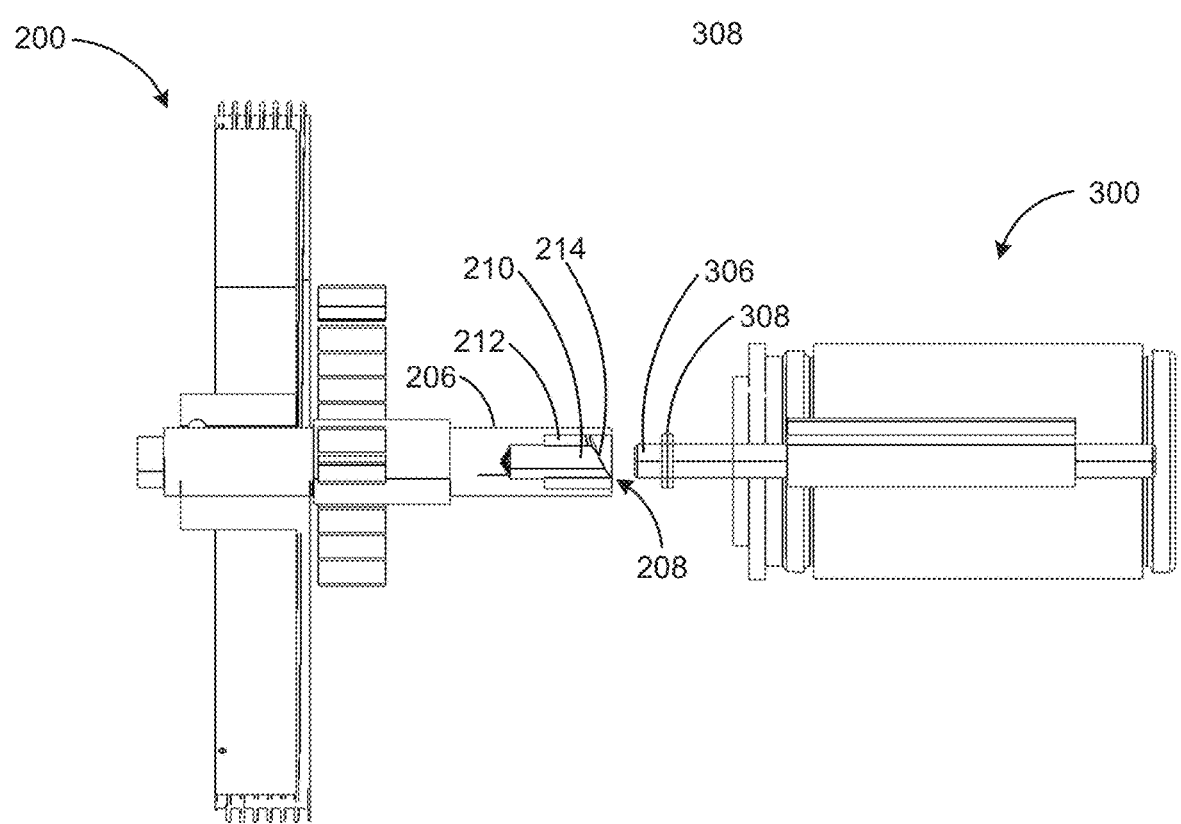

FIGS. 4A and 4B illustrate the removable coupling of sensor assembly 300 with reel assembly 200. As shown FIGS. 4A and 4B, first portion 210 of the lumen of reel shaft 206 may extend a first predefined distance from inlet 208 into reel shaft 206, and additional portion 212 of the lumen of reel shaft 206 may extend a second predefined distance from inlet 208 into reel shaft 206. For example, the difference between the first and second predefined distances may correspond with the distance of protrusions 308 from the distal end of sensor shaft 306, thereby providing additional stability to sensor shaft 306 when sensor shaft 306 is fully inserted within the lumen of reel shaft 206. Alternatively, the first and second predefined distances may be substantially equal. FIG. 4A illustrates sensor shaft 306 at least partially inserted within the lumen of reel shaft 308, and FIG. 4B illustrates sensor assembly 300 removed from reel assembly 200.

Figure 5:
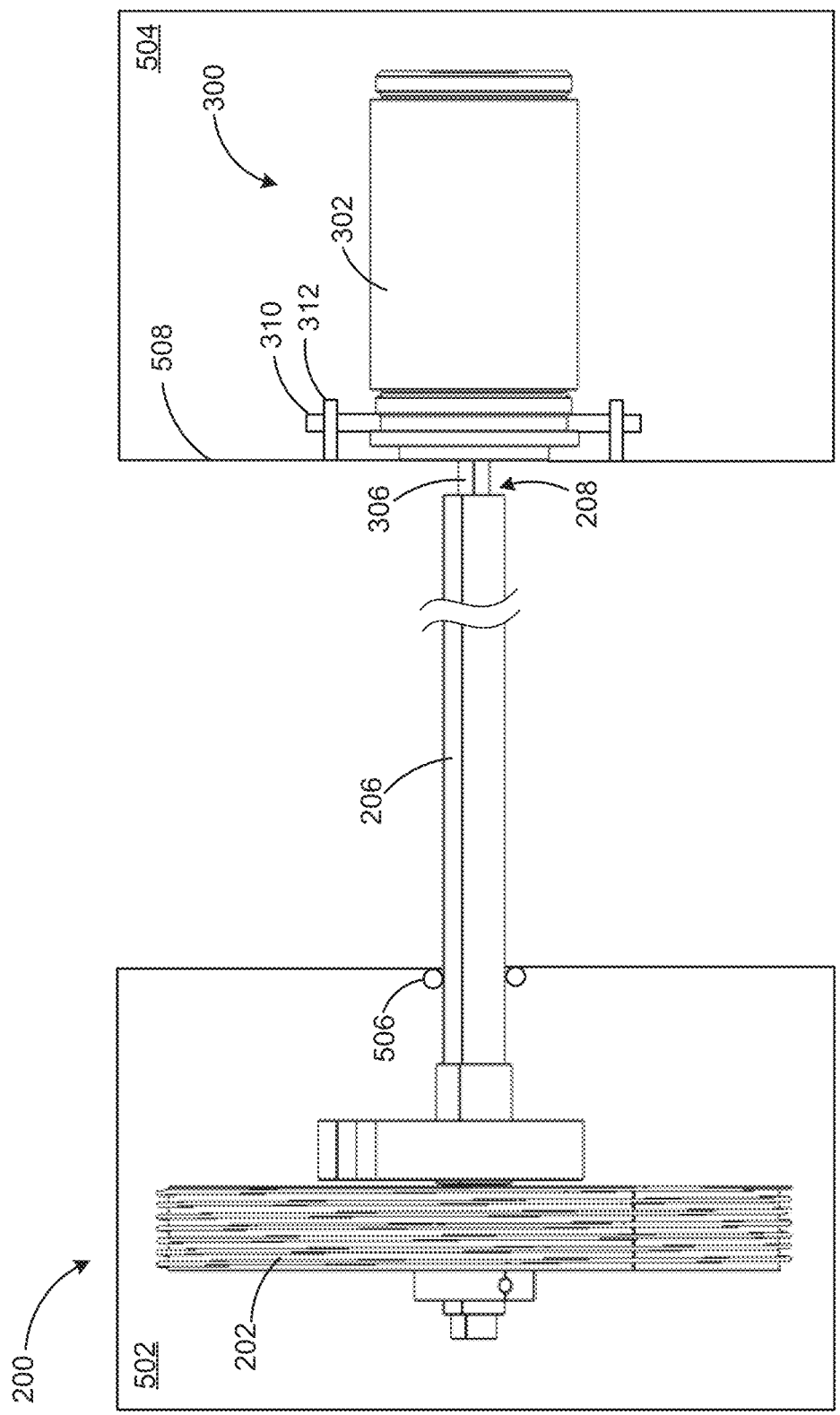
FIG. 5 illustrates another exemplary sensor coupling system constructed in accordance with the principles of the present disclosure.

Referring now to FIG. 5, an alternative exemplary sensor coupling system is provided. As described above, the length of reel shaft 206 may be selected such that reel assembly 200 and sensor assembly 300 are disposed in separate compartments within the same or different structures. For example, as shown in FIG. 5, reel assembly 200 may be disposed within first compartment 502, e.g., by mounting the housing (not shown) to a first fixed surface within first compartment 502, such that reel 202 may rotate relative to the first fixed surface. In addition, sensor assembly 300 may be disposed within second compartment 504, spaced a predefined distance from first compartment 502. Accordingly, reel shaft 206 may have a predefined length selected to span the predefined distance from first compartment 502 to second compartment 504, such that inlet 208 is positioned adjacent to or within second compartment 504.

For example, first compartment 502 may be a compartment that may potentially expose reel assembly 200 to corrosive materials, e.g., the interior of a fuel tank. Thus, to prevent or otherwise limit exposure of sensor assembly 300 to the corrosive material within first compartment 502, sensor assembly 300 may be disposed within second compartment 504. For example, second compartment 504 may be a separate compartment from first compartment 502, e.g., the exterior of the fuel tank. Accordingly, reel shaft 206 may have a length sufficient to span the distance between first compartment 502 and second compartment 504, e.g., the width of the wall/housing of the fuel tank.

Moreover, as shown in FIG. 5, a sealing ring, e.g., O-ring 506, may be disposed over reel shaft 506, e.g., within first compartment 502, to further reduce exposure of sensor assembly 300 to the corrosive material within first compartment 502. O-ring 506 may be formed of a material that permits rotation of reel shaft 206 relative to O-ring 506. As shown in FIG. 5, sensor assembly may be removably coupled to second fixed surface 508 within second compartment 504, such that sensor assembly 300 is fixed relative to the housing within first compartment 502, and relative rotation between sensor shaft 306 and sensor body 302 may be measured by sensor assembly 300. For example, sensor body 302 may include extended portion 310 extending therefrom, which may be removably fixed to second fixed surface 508 via actuators 312, e.g., a plurality of screws.

Figure 6:
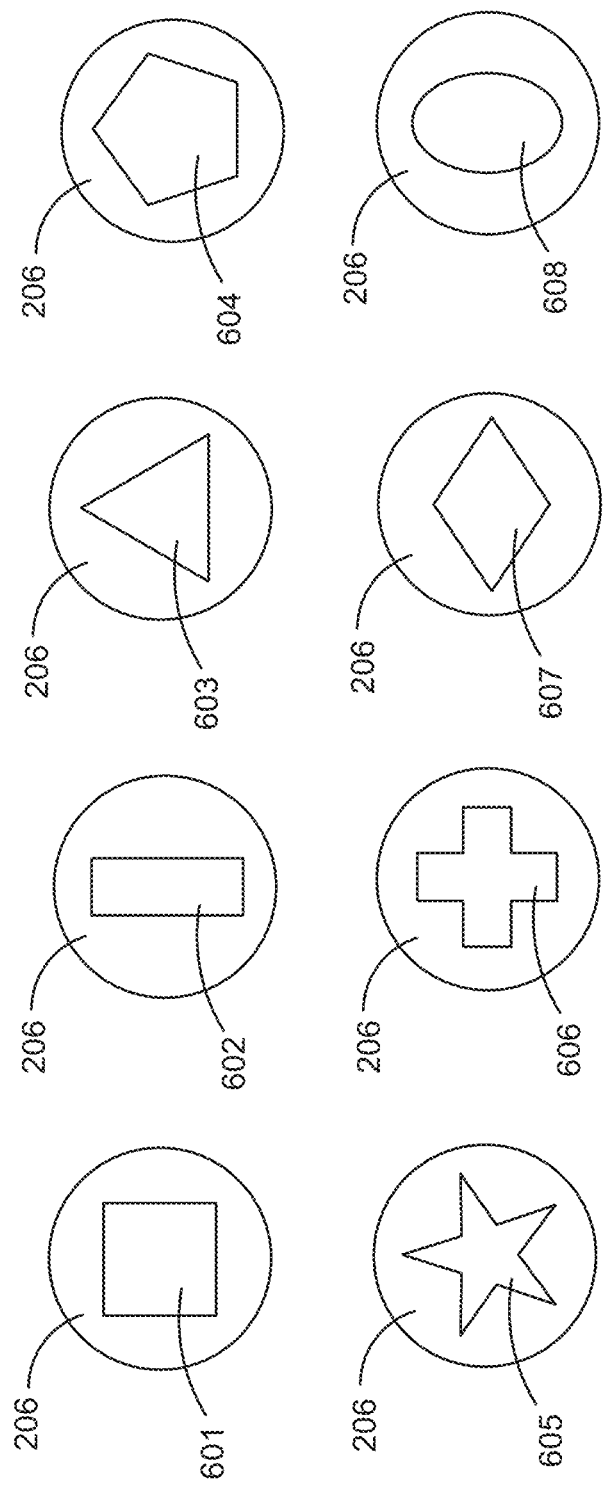
FIG. 6 illustrates cross-sectional views of various configurations of the reel shaft constructed in accordance with the principles of the present disclosure.

Referring now to FIG. 6, various alternative corresponding geometries of the lumen of the reel shaft and the sensor shaft are provided. As described above, reel shaft 206 may have any predefined geometry corresponding to the geometry of sensor shaft 306, such that, when sensor shaft 306 is disposed within the lumen of reel shaft 206, rotational movement of sensor shaft 306 relative to reel shaft 206 is prohibited. For example, as shown in FIG. 6, reel shaft 206 may have square shaped lumen 601, rectangular shaped lumen 602, triangular shaped lumen 603, pentagon shaped lumen 604, star shaped lumen 605, cross shaped lumen 606, diamond shaped lumen 607, oval shaped lumen 608, or any other oblong or polygonal shape that would prevent relative rotational movement between sensor shaft 306 and reel shaft 206. Accordingly, sensor shaft 306 may have a geometry corresponding with the select geometry of the lumen of reel shaft 206.

As will be understood by a person having ordinary skill in the art, the removable coupling systems described herein may be implemented in various applications where rotational sensors may be utilized. For example, the rotational sensor may be configured to measure rotational movement of the sensor shaft responsive to rotation of the reel due to displacement of an external object coupled to the cable driven reel assembly within a fuel tank. As another example, the external object coupled to the cable driven reel assembly may be an aerodynamic structure, e.g., the aileron of an airplane wing, such that the measured rotational movement of the sensor shaft is indicative of the angle of the aerodynamic structure. As another example, the external object coupled to the cable driven reel assembly may be a vehicle wheel, such that the measured rotational movement of the sensor shaft is indicative of the suspension of the vehicle. As another example, the external object coupled to the cable driven reel assembly may be a crash test dummy used in a vehicle crash simulation, such that the measured rotational movement of the sensor shaft is indicative of the impact of the crash test dummy.

While various illustrative embodiments of the invention are described above, it will be apparent to one skilled in the art that various changes and modifications may be made therein without departing from the invention. The appended claims are intended to cover all such changes and modifications that fall within the true scope of the invention.

What is claimed:
1. A sensor coupling system comprising:
   a spring-loaded reel comprising a reel shaft, the reel shaft having a lumen comprising a predefined geometry; and
   a sensor comprising:
      a sensor body configured to be removably coupled to a fixed surface; and a sensor shaft rotatably coupled to the sensor body, the sensor shaft configured to be slidably received by the lumen of the reel shaft, the sensor shaft comprising a geometry corresponding to the predefined geometry of the lumen of the reel shaft such that, when disposed within the lumen of the reel shaft, the sensor shaft cannot rotate relative to the reel shaft, wherein the sensor is configured to measure an amount of rotation of the sensor shaft relative to the sensor body responsive to rotation of the spring-loaded reel via the reel shaft.

2. The sensor coupling system of claim 1, wherein the spring-loaded reel comprises a circular profile.

3. The sensor coupling system of claim 2, further comprising:
a cable having a first end coupled to a point along the circular profile of the spring-loaded reel, and an opposite end coupled to an external component, such that the cable at least partially wraps around the spring-loaded reel along the circular profile,
wherein movement of the external component causes movement of the cable, thereby causing rotation of the spring-loaded reel.

4. The sensor coupling system of claim 1, wherein an inlet of the reel shaft comprises one or more tapered geometries configured to facilitate alignment of the geometry of the sensor shaft within the predefined geometry of the lumen of the reel shaft.

5. The sensor coupling system of claim 4, wherein the one or more tapered geometries comprise one or more ramp portions extending along an inner surface of the lumen of the reel shaft.

6. The sensor coupling system of claim 1, wherein the sensor shaft comprises one or more radially extending protrusions, and wherein the predefined geometry of the lumen of the reel shaft is sized and shaped to receive the sensor shaft and the one or more radially extending protrusions such that, when disposed within the lumen of the reel shaft, the sensor shaft and the one or more radially extending protrusions cannot rotate relative to the reel shaft.

7. The sensor coupling system of claim 6, wherein the one or more radially extending protrusions are evenly distributed along a circumference of the sensor shaft.

8. The sensor coupling system of claim 6, wherein the one or more radially extending protrusions comprise a pair of radially extending protrusions disposed on opposite sides of the sensor shaft.

9. The sensor coupling system of claim 6, wherein the sensor shaft comprises a circular profile, and wherein the one or more radially extending protrusions are disposed along an outer surface of the sensor shaft.

10. The sensor coupling system of claim 1, wherein the sensor shaft comprises an oblong shape, and wherein the predefined geometry of the lumen of the reel shaft comprises a corresponding oblong shape such that, when disposed within the lumen of the reel shaft, the sensor shaft cannot rotate relative to the reel shaft.

11. The system coupling system of claim 10, wherein the oblong shape is an oval, triangle, square, rectangle, diamond, star, or other polygon shape.

12. The system coupling system of claim 1, wherein the sensor comprises at least one of a potentiometer, an encoder, or a rotating transducer.

13. The system coupling system of claim 1, wherein the sensor is configured to generate one or more signals indicative of the measured amount of rotation of the sensor shaft relative to the sensor body, and wherein the sensor body comprises one or more terminals configured to transmit the one or more signals.

14. The sensor coupling system of claim 1, further comprising:
a housing configured to be a coupled to a second fixed surface,
wherein the spring-loaded reel is rotatably disposed within the housing.

15. The sensor coupling system of claim 14, wherein the housing comprises the fixed surface removably coupled to the sensor body, the housing further comprising:
an inlet configured to receive at least a portion of the sensor body therein; and
an expandable lip adjacent to the inlet, the expandable lip configured to be actuated to transition between a collapsed state and an expanded state, the expandable lip configured to fix the sensor body relative to the housing in the expanded state.

16. The sensor coupling system of claim 15, wherein the housing comprises one or more screws operatively coupled to the expandable lip, the one or more screws configured to be actuated to transition the expandable lip from the collapsed state to the expanded state.

17. A sensor coupling system comprising:
a housing configured to be mounted to a fixed surface;
a spring-loaded reel rotatably disposed within the housing and comprising a reel shaft, the reel shaft having a lumen comprising a predefined geometry; and
a sensor comprising:
a sensor body configured to be removably coupled to the housing; and
a sensor shaft rotatably coupled to the sensor body, the sensor shaft configured to be slidably received by the lumen of the reel shaft, the sensor shaft comprising a geometry corresponding to the predefined geometry of the lumen of the reel shaft such that, when disposed within the lumen of the reel shaft, the sensor shaft cannot rotate relative to the reel shaft,
wherein the sensor is configured to measure an amount of rotation of the sensor shaft relative to the sensor body responsive to rotation of the spring-loaded reel via the reel shaft.

18. The sensor coupling system of claim 17, wherein the housing comprises:
an inlet configured to receive at least a portion of the sensor body therein; and
an expandable lip adjacent to the inlet, the expandable lip configured to be actuated to transition between a collapsed state and an expanded state, the expandable lip configured to fix the sensor body relative to the housing in the expanded state.

19. The sensor coupling system of claim 18, wherein the housing comprises one or more screws operatively coupled to the expandable lip, the one or more screws configured to be actuated to transition the expandable lip from the collapsed state to the expanded state.

20. The sensor coupling system of claim 17, wherein the sensor shaft comprises one or more radially extending protrusions, and wherein the predefined geometry of the lumen of the reel shaft is sized and shaped to receive the sensor shaft and the one or more radially extending protrusions such that, when disposed within the lumen of the reel shaft, the sensor shaft and the one or more radially extending protrusions cannot rotate relative to the reel shaft.

21. The sensor coupling system of claim 17, further comprising:

a cable having a first end coupled to a point along the circular profile of the spring-loaded reel, and an opposite end coupled to an external component outside of the housing, such that the cable at least partially wraps around the spring-loaded reel along the circular profile, wherein movement of the external component causes movement of the cable, thereby causing rotation of the spring-loaded reel.

* * * * *